W. OBRIST.

Ribbon Blocks.

No. 6,002

Reissued Aug. 4, 1874.

WITNESSES:

E. Wolff

Chalgnick

INVENTOR:

W. Obrist

BY

Munn & Co

ATTORNEYS.

THE NORRIS PETERS CO., PHOTO-LITHO., WASHINGTON, D. C.

UNITED STATES PATENT OFFICE.

WILLIAM OBRIST, OF NEW YORK, N. Y., ASSIGNOR TO GEORG MEYER.

IMPROVEMENT IN RIBBON-BLOCKS.

Specification forming part of Letters Patent No. 139,326, dated May 27, 1873; reissue No. 6,002, dated August 4, 1874; application filed April 25, 1874.

*To all whom it may concern:*

Figure 1:
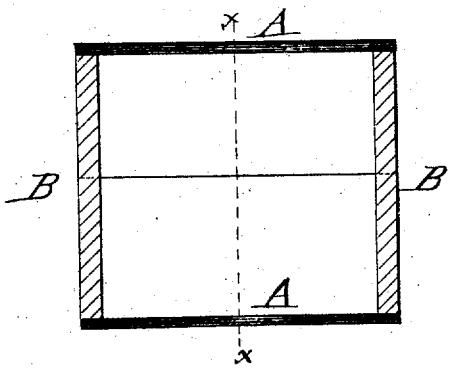
Figure 2:
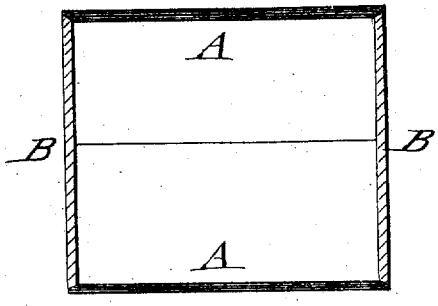
Figure 3:
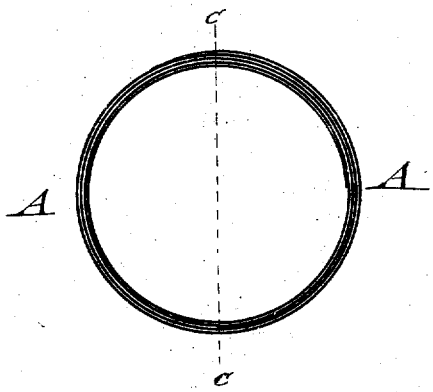

Be it known that I, WILLIAM OBRIST, of the city, county, and State of New York, have invented a new and Improved Ribbon-Block, of which the following is a specification:

In the accompanying drawing, Figures 1 and 2 represent vertical longitudinal sections of my improved ribbon-block on the line *c c*, Fig. 3. Fig. 3 is a vertical transverse section of the same on the line *x x*, Fig. 1.

Similar letters of reference indicate corresponding parts.

The object of my invention is to furnish to manufacturers of silk and other ribbons an improved ribbon-block, which, on account of its strength, durability, and cheapness, excels the pasteboard blocks used for ribbons of smaller sizes, and is mainly intended as a substitute for the heavy solid wooden blocks used for the larger sizes of ribbons. My invention consists of a cylindrical tube rolled of a continuous strip of cheap straw or other paper, the layers of which adhere by the application of some cheap mucilage or paste. This tube is strengthened by side or end disks of suitable material, forming therewith a strong cylindrical ribbon-block.

In the drawing, A represents the tube or convex surface of the cylindrical block, produced by rolling a continuous piece or strip of cheap straw paper over a cylindrical roller, providing at the same time the inner side with some cheap paste till a thickness of sufficient strength to correspond with the different widths and qualities of ribbon is obtained. A strong tube, which resists pressure and supports the ribbon wound upon it, is furnished thereby, which, in connection with the stiffening end or side disks B, which are turned or cut out of wood or other equivalent material possessing the requisite degree of rigidity, forms an economical block, by which not only the original expense but also the cost of freight is reduced. The disks B are glued sidewise to the tube after the same is dry, forming the top and bottom of the cylinder, as shown in Fig. 1.

In constructing ribbon-blocks according to my invention, I preferably use wooden end heads or side disks, but other equivalent materials possessing the requisite degree of rigidity may be employed for covering the ends of and stiffening the pasteboard shell.

Having thus described my invention, I claim as new and desire to secure by Letters Patent—

A ribbon block or roller consisting of the pasteboard shell or body A and the stiffening end heads or disks B, of wood or equivalent rigid material, substantially as described.

WILLIAM OBRIST.

Witnesses:

PAUL GOEPEL,

T. B. MOSHER.